April 15, 1924.
F. WHITNEY
ROLLER BEARING
1,490,688
Filed Sept. 15, 1921      2 Sheets-Sheet 1
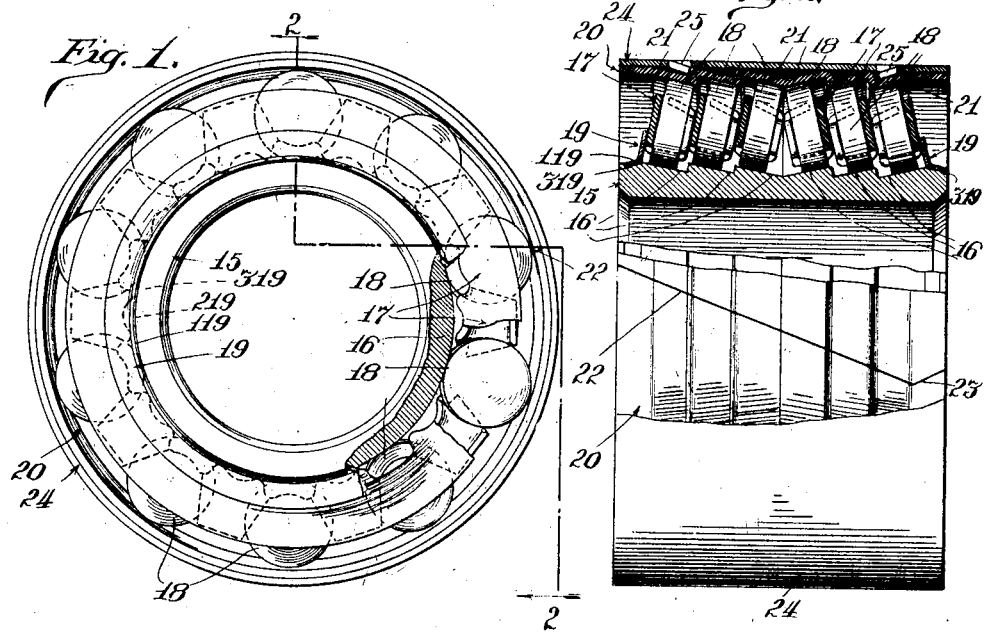
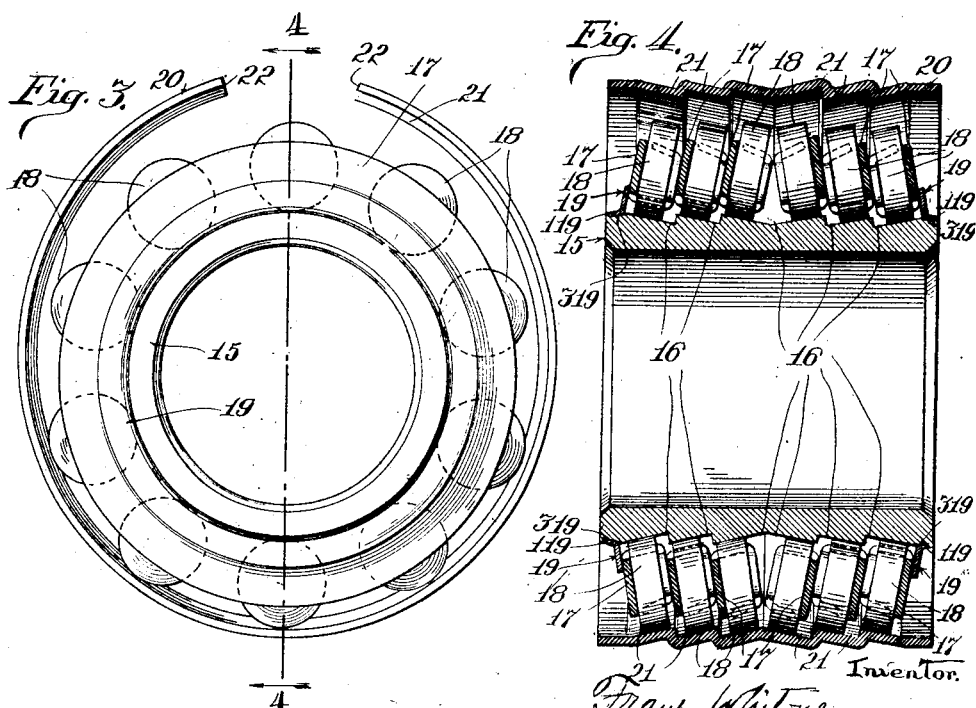
Inventor.
Frank Whitney
Barnett - Truman
Attorneys.

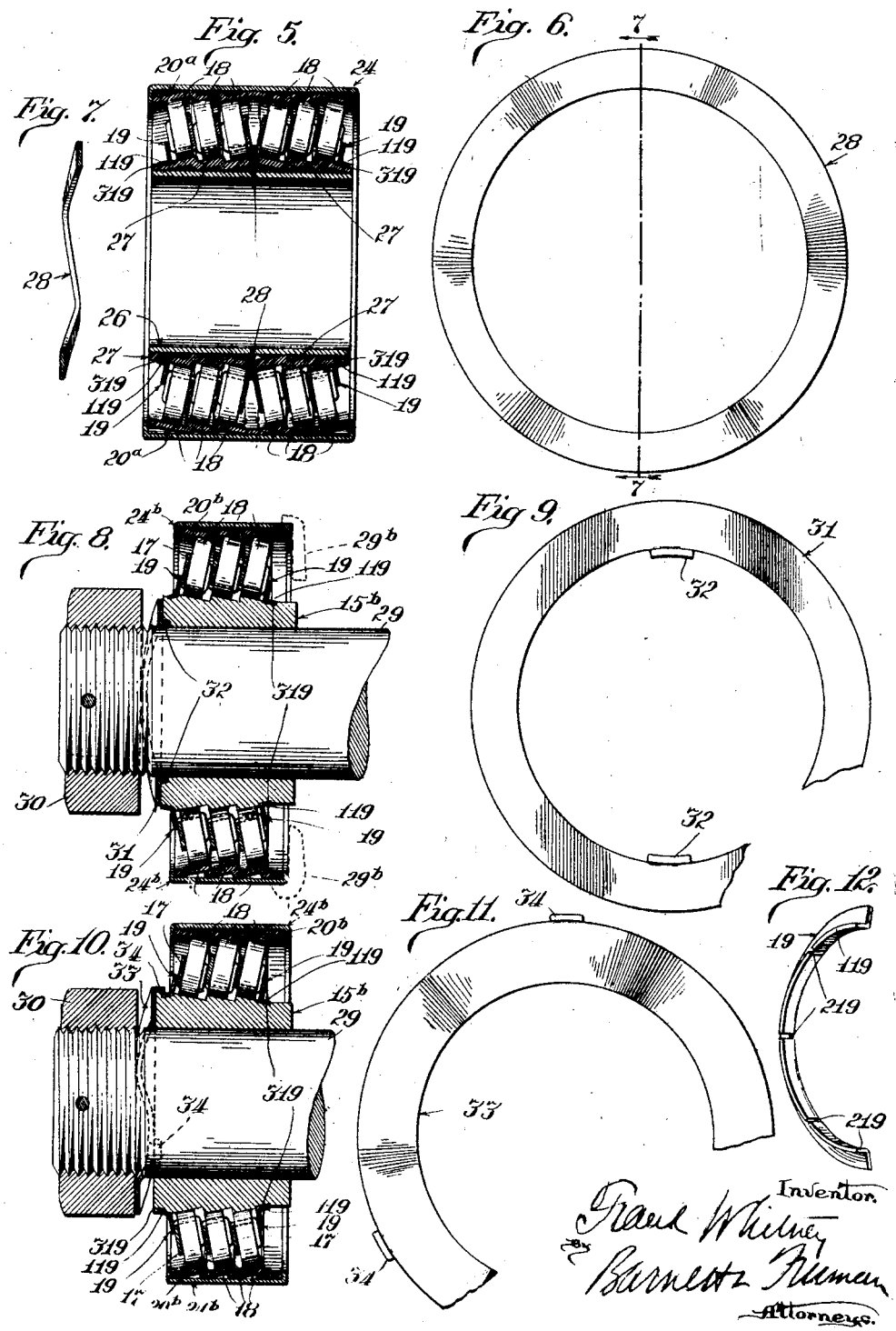

Patented Apr. 15, 1924.

1,490,688

UNITED STATES PATENT OFFICE.

FRANK WHITNEY, OF HUBBARD WOODS, ILLINOIS.

ROLLER BEARING.

Application filed September 15, 1921. Serial No. 500,957.

*To all whom it may concern:*

Be it known that I, FRANK WHITNEY, a citizen of the United States, residing at Hubbard Woods, in the county of Cook and State of Illinois, have invented certain new and useful Improvements in Roller Bearings, of which the following is a specification.

My invention relates to end thrust and radial load roller bearings, and it has for one of its principal objects the provision of a bearing of this type which shall have a larger capacity for both radial and thrust loads than the bearings of the same size heretofore made and sold. It is another object of my invention to provide certain improved arrangements and devices for taking up lost motion or looseness in the parts of the bearing whereby the rollers are at all times kept in proper contact with the bearing members. Another object is to provide a structure which may be produced readily and cheaply and which may be assembled and disassembled quickly and easily. It is another object of my invention to provide certain retaining means of novel construction for the essential parts of the bearing whereby said parts, after being assembled, are kept in the proper relationship with each other before the bearing is placed in the position of use, the bearing, in other words, being a complete unitary structure when it leaves the factory. The preferred means by which I have accomplished my several objects are illustrated in the drawings and hereinafter specifically described. That which I believe to be new and desire to cover by this application is set forth in the claims.

In the drawings:—

Fig. 1 is a side view of a bearing embodying my improvements, being partly broken away for clearness of illustration.

Fig. 2 is a vertical cross section taken on line 2—2 of Fig. 1.

Fig. 3 is a view similar to Fig. 1, but with the outer cylindrical member removed.

Fig. 4 is a vertical cross section taken on line 4—4 of Fig. 3.

Fig. 5 is a vertical cross section through a bearing illustrating another form of construction.

Fig. 6 is a face view of a spring washer forming a part of the bearing shown in Fig. 5.

Fig. 7 is a vertical cross section taken on the line 7—7 of Fig. 6 upon a reduced scale.

Fig. 8 is a vertical cross section through a modified form of bearing mounted upon a shaft.

Fig. 9 is a face view of the spring washer employed in the bearing of Fig. 8.

Fig. 10 is a view similar to Fig. 8 but showing still another modified form of construction.

Fig. 11 is a face view of the spring washer of the construction shown in Fig. 10, the same being partly broken away.

Fig. 12 is a view in perspective of a retaining ring for holding the rollers and their cages on the bearing members.

Referring now to Figs. 1 to 4, and Fig. 12, inclusive, 15 indicates the inner bearing member of my improved construction, the outer face of which is cut or otherwise formed, to provide a plurality of equal sized conical bearing surfaces or raceways 16, which are necessarily offset with respect to each other, as is clearly shown in Figs. 2 and 4. In the construction shown in said figures, the raceways at one end of the bearing sleeve 15 are oppositely inclined as compared with those at the opposite end. Mounted upon the bearing sleeve 15 there are a plurality of cages 17 each provided with a plurality of roller elements of any suitable type, preferably disk rollers 18, the arrangement being such that the rollers are held in spaced relation to each other so as to be capable of rotation within the cages, the rollers being supported in contact with the bearing member 15. The cages act as guides for the disk rollers 18 to keep the same in alignment. The rollers and cages are held in position by means of rings 19 having flanges 119 (Fig. 12) which are formed with cuts 219 or may be crimped so as to be expansible, the rings seating in suitable grooves 319 in the outer face of the bearing sleeve 15. These retaining rings have smooth inner faces to bear against the roller cages and as their flanges 119 expand when the rings are forced on bearing members 15 they can not be removed without disassembling the entire bearing.

The outer bearing member against which the outer faces of the rollers 18 contact is in the form of an open ring or sleeve 20 formed of sheet metal and preferably rolled or spun for providing raceways 21 on its inner face, such raceways 21 being disposed in parallelism with the raceways 16 of the inner bearing member 15. As shown at 22 in Fig. 2, the sleeve is open along a diagonal line so as to provide that the rollers of the several series do not cross the line of severance of bearing member 20 at the same time. So long as five rollers have a firm support at all times while the sixth roller is passing the break, the pressure of the sixth roller at the break is relieved and undue wear at this point prevented. As a precaution for preventing lateral movement of one end of the open ring with respect to the other end, I have reversed the direction of the cut at one side as shown at 23 in Fig. 2. The sleeve 21, it will be understood, may be manufactured in cylindrical form and severed along line 22, 23, or a flat piece of metal with its ends suitably cut may be bent to the desired shape.

With the several cages 17 mounted upon the inner bearing sleeve 15 as shown in Fig. 4, the partially assembled bearing is inserted within the sleeve 20 as shown in said Fig. 4. The outer bearing sleeve 20 is then pressed down into snug contact with the disk rollers 18, serving to bring the ends of the ring 20 into contact as shown in Fig. 2, whereupon the bearing thus assembled can be inserted within an endless retaining sleeve 24. The assembled bearing may be secured in the sleeve 24 in any suitable manner. For example, sleeve 20 may be formed with a pair or pairs of inwardly bent oppositely disposed tongues 25 which engage with the offsets of bearing member 20 provided when the raceways are formed. The retaining sleeve may constitute a permanent part of the bearing, or may be used simply to hold the bearing sleeves and rollers in assembled relation until the bearing is put in the place where it is to be used. Where the retainer is used only temporarily, it may be aligned with the housing into which the bearing is to be placed, and the faces of the bearing, the sleeves 15, 20 and the rollers and their cages forced from the retainer into the housing (after bending up one of the tongues 25) without disturbing the assembled relation of the other parts of the bearing.

In the construction shown in Figs. 5, 6 and 7, the arrangement is quite similar to that already described, but provision is made for taking up any lost motion, due to wear or other causes, between the rollers and the members against which they bear; and the device employed for this purpose has the important advantage of simplicity and compactness. Instead of the inner sleeve 15 of the other construction I employ a cylindrical sleeve 26 on which are arranged two bearing members 27, 27, formed with conical bearing surfaces. These bearing surfaces and the bearing surfaces on the outer member 20$^a$ have a slant giving the rollers of each set an inclination outwardly and away from the rollers of the other set. Between the members 27, 27 is interposed an annular spring member 28 formed with undulations, radially as shown in Fig. 7, there being preferably six of these bends or undulations which preferably extend across the annular member from its inner to its outer edge so as to provide three offsets on each side of the member. This member 28 is compressed and to a certain extent or wholly flattened out when the bearing is assembled. Its expansion and thrust against bearing members 27 takes up any looseness developed on the bearing through wear of the parts.

In the construction shown in Figs. 8 and 9, the inner sleeve 15$^b$ is shown mounted upon a shaft 29 and the outer sleeve 24$^b$ abutted against an element indicated by dotted line 29$^b$. Upon the threaded end of the shaft 29 there is a nut 30 and a spring washer 31 is interposed between the nut 30 and the adjacent end of the inner bearing member 15$^b$. As shown in Fig. 9, the spring washer 31 is provided with lugs 32 on its inner edge which are bent to one side and turned outwardly slightly so as to have a spring grip upon the cut-under flaring edge of the sleeve 15$^b$. In Fig. 8, the nut 30 is shown in the course of application before the washer 31 has been flattened by the complete tightening of the nut. As will be understood, with the nut 30 tightened so as to flatten the washer 31, there will be a contant tendency to push the inner bearing member 15$^b$ toward the right in said figure so as to compensate for wear on the bearing, serving to keep the bearing constantly in properly adjusted condition.

In the construction shown in Figs. 10 and 11, a washer 33 is substituted in place of the washer 31, the washer 33 being provided with lugs 34 on its outer edge in lieu of the lugs 32 on the inner edge. The lugs 34 are bent over and turned inwardly to a slight degree so as to have a spring engagement with the beveled outer face of the inner bearing sleeve 15$^b$.

As will be seen by an examination of Fig. 9, the washer 31 is provided with only two high points on each face, while the washer 33 shown in Fig. 11 is provided with three high points on each face. It will be understood that I do not wish to limit myself in respect to the detailed form of the spring washers except as is hereinafter specifically claimed.

While I prefer to secure the open sleeves within the retaining sleeves by turning down the edges of the retaining sleeves as is illustrated in Figs. 5, 8 and 10, and particularly in the form of structure there shown in which a spring washer is employed, it will be understood that I do not restrict myself to that expedient except as hereinafter specifically claimed.

By making the outer bearing member in the form of an open annulus, that is, an annulus severed in the direction, generally, of its length, that is to say in the direction of the axis of the bearing and forming such member with the required number of conical bearing surfaces, I provide a bearing the overall diameter of which is relatively small in comparison to its capacity for sustaining radial loads and end thrusts. With the outer bearing member in this form, it may be very economically manufactured and the parts of the bearing easily and quickly assembled. The annular spring members in the arrangements shown in Figs. 5 to 10 inclusive, provide expedients for take up of the parts of the bearings which are simple, economical and involve little or no increase in the dimensions of the bearing. This latter consideration is of first rate importance, as it is very desirable that a bearing of this sort be as small and compact as is possible without sacrifice of strength and load resisting capacity.

It will be understood that modifications of various kinds may be made in the constructions and arrangement without departing from the spirit of my invention. For example, I have shown on the drawings the roller elements in the form of cylindrical discs, whereas equivalent antifriction roller elements of any other suitable form may be employed instead of those shown. I do not, therefore, wish to be restricted to the particular constructions, arrangements and devices shown and described, except as the same are specifically claimed hereinafter. In referring to the raceways or bearing surfaces as conical, I have reference to their general inclination with relation to the axis of the bearing. The exact configuration of those surfaces will depend upon the configuration of the roller elements. The cones or raceways on each of the bearing elements are specified as of equal size. This term does not have reference to the relative widths of the bearing surfaces but to the fact that the cones are formed to accommodate rollers of equal diameter.

I claim:

1. A thrust and radial load bearing, comprising inner and outer bearing members and interposed roller elements, the bearing members being each provided with a plurality of equal sized conical raceways which, in the case of one of said members, are formed integral therewith, the outer of said members being formed so that it can be opened for assembly of the parts of the bearing.

2. A thrust and radial load bearing, comprising inner and outer bearing members and interposed roller elements, the bearing members being each provided with a plurality of equal sized conical raceways which, in the case of one of said members, are formed integral therewith, said bearing member being open in the direction of the axis of the bearing to permit assembly therewith of the roller element and other bearing element.

3. A thrust and radial load bearing, comprising inner and outer bearing members and interposed roller elements, the bearing members being each provided with a plurality of equal sized conical raceways, one of said members consisting of a single piece of metal having said raceways formed integrally therein and the other being open in the direction of the axis of the bearing to permit assembly of the parts of the bearing.

4. A thrust and radial load bearing, comprising inner and outer bearing members and interposed roller elements, the bearing members being each provided with a plurality of equal sized conical raceways, one of said members consisting of a single piece of metal adapted to be bent to an annular shape and having said raceways formed integrally therein.

5. A thrust and radial load bearing, comprising inner and outer bearing members and interposed roller elements, the bearing members being each provided with a plurality of equal sized conical raceways, one of said members consisting of a single piece of metal having said raceways formed integrally therein, bent to a shape approximating annular shape and adapted to be further bent into the form of an annulus.

6. A thrust and radial load bearing, comprising in combination an inner bearing member formed with a plurality of offset raceways, a plurality of roller elements, means for assembling the roller elements and the inner member as a single structural unit, and an outer bearing member formed so that the inner bearing member and roller elements may be inserted into the same when assembled as a unit as aforesaid.

7. A thrust and radial load bearing, comprising inner and outer bearing members and interposed roller elements, the bearing members being each formed with a plurality of integral conical raceways of equal size and the outer member being open in the general direction of the axis of the bearing to permit assembly of the parts of the bearing.

8. A thrust and radial load bearing, comprising inner and outer bearing members and interposed roller elements, the bearing members being each formed with a plurality of integral conical raceways of equal size, and the outer member consisting of a single piece of metal having a shape approximately annular but with its meeting edges spread apart and adapted to be bent to the form of an annulus when the bearing is assembled.

9. A thrust and radial load bearing, comprising in combination an inner bearing member formed with a plurality of offset raceways, a plurality of roller elements, cages for holding said roller elements in annular series, means for retaining said cages on the inner bearing member and an outer bearing member formed so that the inner bearing member, roller elements and cages may be inserted into the same as a unit.

10. A thrust and radial load bearing, comprising inner and outer bearing members and interposed roller elements, the bearing members being each provided with a plurality of equal sized conical raceways which, in the case of the outer member, are formed integrally therewith, said outer bearing member being open in the direction of the axis of the bearing to permit assembly therewith of the roller elements and inner bearing member.

11. A thrust and radial load bearing, comprising inner and outer bearing members and interposed roller elements, the outer bearing member consisting of a single piece of metal bendable to an annular shape with a plurality of conical raceways formed integrally therein.

12. A thrust and radial load bearing, comprising inner and outer bearing members each having a plurality of conical bearing faces and interposed roller elements, the outer bearing member consisting of a single piece of metal having a shape approximately annular but with its meeting edges spread apart and adapted to be bent to the form of a true annulus when the bearing is assembled.

13. A thrust and radial load bearing, comprising inner and outer bearing members and interposed roller elements, the bearing members being each provided with a plurality of equal sized conical raceways, the inner bearing member comprising an endless annulus and the outer member of an open annulus.

14. A thrust and radial load bearing, comprising inner and outer bearing members each having a plurality of integrally formed equal sized conical raceways, the inner member comprising an endless annulus and the outer member of an open annulus.

15. A thrust and radial load bearing, comprising, in combination, an inner bearing member provided with a plurality of offset parallel conical raceways, an outer bearing member having correspondingly formed raceways, and a plurality of roller elements interposed between said bearing members, said outer member consisting of a piece of metal bendable to annular form.

16. A thrust and radial load bearing, comprising, in combination, an inner bearing member provided with a plurality of offset parallel conical raceways, an outer bearing member having correspondingly formed raceways, a plurality of roller elements interposed between said bearing members, said outer member consisting of a piece of metal bendable to annular form, and retaining means for holding the parts of the bearing in assembled position.

17. A thrust and radial load bearing, comprising, in combination, an inner bearing member provided with a plurality of offset parallel conical raceways, an outer bearing member having correspondingly formed raceways, a plurality of roller elements interposed between said bearing members, said outer member consisting of a piece of metal bendable to annular form, and an endless annular retaining device surrounding said outer bearing member.

18. A thrust and radial load bearing, comprising inner and outer bearing members and interposed roller elements, the bearing members being each provided with a plurality of equal sized conical raceways which, in the case of the outer member, are formed integrally therewith, said outer bearing member being open in the direction of the axis of the bearing to permit assembly therewith of the roller elements and inner bearing member, and an annular retaining member enclosing the aforesaid parts.

19. A thrust and radial load bearing, comprising inner and outer bearing members and interposed roller elements, the outer bearing member consisting of a single piece of metal bendable to an annular shape with a plurality of conical raceways formed integrally therein, and an annular retaining member enclosing the aforesaid parts.

20. A thrust and radial load bearing, comprising inner and outer bearing members each formed with a plurality of bearing surfaces and interposed roller elements, the outer bearing member consisting of a single piece of metal having a shape approximately annular but with its meeting edges spread apart and adapted to be bent to the form of a true annulus when the bearing is assembled, and an annular retaining member enclosing the aforesaid parts.

21. A bearing member for a thrust and radial load bearing consisting of a piece of sheet metal formed with a series of parallel, circumferential off-sets providing between them a series of conical bearing surfaces.

22. A bearing member for a thrust and radial load bearing consisting of a piece of sheet metal in the form of an open annulus formed with a series of parallel offsets providing between them a series of conical bearing surfaces.

23. A bearing member for a thrust and radial load bearing constituted of a piece of sheet metal formed with a series of parallel circumferential offsets providing between them a series of bearing surfaces.

24. A bearing member for a thrust and radial load bearing consisting of a piece of sheet metal in the form of an open annulus formed with a series of parallel offsets providing between them a series of bearing surfaces.

25. A thrust and radial load bearing comprising inner and outer bearing members and interposed roller elements, the bearing members being provided each with a plurality of offset conical raceways and the outer member consisting of an open annulus with the raceways formed integrally therein.

26. A thrust and radial load bearing comprising, in combination, an inner bearing member having a plurality of offset bearing surfaces, an outer bearing member in the form of an open annulus having bearing surfaces correspondingly formed, and a plurality of series of roller elements arranged between the opposed surfaces on said bearing members, respectively.

27. A thrust and radial load bearing comprising, in combination, an inner bearing member having a plurality of offset bearing surfaces, an outer bearing member in the form of an open annulus having bearing surfaces correspondingly formed, a plurality of series of roller elements arranged between the opposed surfaces on said bearing members respectively, and an annular retaining member enclosing the aforesaid parts.

28. A thrust and radial load bearing comprising in combination, an inner bearing member having a plurality of thrust and radial bearing surfaces, an outer bearing member in the form of an open annulus having bearing surfaces correspondingly formed, and a plurality of series of roller elements arranged between the opposed surfaces on said bearing members, respectively, one of said members being formed with a groove, and an expansible ring in said groove to retain the roller elements.

29. A thrust and radial load bearing comprising, in combination, an inner bearing member having a plurality of thrust and radial bearing surfaces, an outer bearing member in the form of an open annulus having bearing surfaces correspondingly formed, a plurality of series of roller elements arranged between the opposed surfaces on said bearing members respectively, the inner member being formed with grooves at opposite ends, and expansible rings in said grooves to retain the roller elements in place.

30. A thrust and radial load bearing comprising in combination an inner bearing element having a plurality of bearing surfaces, those on one side of the bearing being oppositely inclined to those at the other side, an outer bearing element in the form of an open annulus having bearing surfaces correspondingly formed, and a plurality of series of roller elements arranged between the opposed surfaces on said bearing members respectively.

31. A thrust and radial load bearing comprising, in combination, an endless inner bearing member, an outer bearing member in the form of an open annulus, said bearing members being formed each with a plurality of raceways, the raceways on one side of the bearing being oppositely inclined to those on the other side, and two sets of interposed roller elements having axes inclined to correspond to the inclination of said raceways respectively.

32. A thrust and radial load bearing comprising, in combination, an endless inner bearing member, an outer bearing member in the form of an open annulus, said bearing members being formed each with a plurality of raceways, the raceways on one side of the bearing being oppositely inclined to those on the other side, two sets of interposed roller elements having axes inclined to correspond to the inclination of said raceways respectively, and means for retaining the aforesaid parts of the bearing in assembled position.

33. In a thrust and radial load bearing, the combination of inner and outer bearing members each formed with a plurality of bearing surfaces, a plurality of interposed roller elements, one of said bearing members being movable in the direction of the axis of the bearing, and an annular spring element having lateral undulatory bends bearing under stress against the end of the movable element to maintain the parts of the bearing in close contact.

34. In a thrust and radial load bearing, the combination of inner and outer bearing members each formed with a plurality of offset conical bearing surfaces, a plurality of interposed roller elements, one of said bearing members being movable in the direction of the axis of the bearing, and an annular spring element having offsets adapted to be flattened against the movable member when the bearing is assembled to maintain the parts thereof in proper contact.

35. In a thrust and radial load bearing, the combination of inner and outer bearing members each formed with a plurality of bearing surfaces, a plurality of interposed roller elements, the inner bearing member being movable in the direction of the axis of the bearing, and a spring element adapted to bear under stress at a number of equally spaced points against the end of said movable element to maintain the parts of the bearing in close contact.

36. In a thrust and radial load bearing, the combination of inner and outer bearing members each formed with a plurality of bearing surfaces, a plurality of interposed roller elements, one of said bearing members being movable in the direction of the axis of the bearing, an annular spring element having lateral undulatory bends bearing against the end of the movable element to maintain the parts of the bearing in close contact, said spring element being provided with means for attaching it to said movable bearing member.

37. In a thrust and radial load bearing, the combination of two inner bearing members each formed with offset conical bearing surfaces, those on one member being oppositely inclined with respect to those on the other, an outer bearing member provided with correspondingly formed surfaces, interposed roller elements, and an annular spring element formed with undulatory bends adapted to be flattened between the inner bearing members when the bearing is assembled.

38. In a thrust and radial load bearing, the combination of inner and outer bearing members, each formed with a plurality of offset conical bearing surfaces, and a plurality of interposed roller elements; the outer bearing element consisting of an open annulus, the abutting ends of which are formed on a line oblique to said bearing surface.

39. A thrust and radial load bearing comprising, in combination, two inner bearing members, each formed with a plurality of separate conical raceways of the same size, an annular member on which said bearing members are mounted, an outer bearing member in the form of an open annulus formed with a plurality of separate conical raceways of the same size corresponding to the raceways on the inner members, a plurality of series of interposed roller elements, an annular retaining member enclosing the aforesaid parts, and an annular spring element compressed between said inner bearing members, for the purpose described.

40. A thrust and radial load bearing, comprising in combination an inner bearing member having a plurality of offset bearing surfaces, an outer bearing member in the form of an open annulus having bearing surfaces correspondingly formed and a plurality of annular roller cages provided with rollers, and adapted to revolve between said bearing members independently of each other.

41. In combination with the inner and outer bearing members and roller elements of a thrust and radial load bearing, an endless annular take-up member of spring metal formed with undulations and adapted to be engaged and flattened to a greater or less extent when assembled with the other parts of the bearing so as to hold the roller elements and bearing members in proper contact with each other and take up lost motion.

42. In a thrust and radial load bearing, the combination of roller elements and inner and outer bearing members, one of said members being formed with a groove, and an endless retaining ring for holding the roller elements in place on said last named member having a projecting spring portion which is bent when the retaining ring is put into place and snaps into and is held permanently in said groove.

43. In a thrust and radial load bearing, the combination with roller elements and inner and outer bearing members, one of which is formed with a groove, and an endless retaining ring for holding the roller elements in place on said last named member having, at one edge, an expansible circumferential flange adapted to snap into and be held permanently in said groove when the retaining ring is put in place.

44. In a thrust and radial load bearing, the combination with the roller elements and outer and inner bearing members, the latter formed with a groove, of an endless retaining ring for the roller elements provided with an expansible inner edge which snaps into the groove in the inner bearing member when the retaining ring is put in place.

45. In a thrust and radial load bearing, the combination with roller elements and outer and inner bearing members, one of which is formed with a circumferential groove, and an endless retaining ring for the roller elements formed with an expansible circumferential flange at one edge adapted to snap into and be permanently held in the groove in the bearing member when the retaining ring is put into place.

46. In a bearing, the combination of an inner bearing member, an outer bearing member in the form of an open annulus compressible and of circular configuration, and formed with an exterior shoulder, and an endless retaining sleeve to enclose the outer bearing member formed with a spring projection to engage said shoulder to retain the parts in assembled position.

47. In a bearing, the combination of an inner bearing member, an outer bearing member in the form of an open annulus, compressible to circular configuration, and formed with an exterior shoulder, and an endless retaining sleeve to enclose the outer bearing member formed with an inwardly offset spring finger to engage said shoulder and retain the parts in assembled position.

48. In a bearing, the combination of an inner bearing member formed with a plurality of raceways offset with respect to each other, an outer bearing member in the form of an open annulus and formed with circumferential offsets providing on the inner surface of the member raceways corresponding to the raceways on the inner bearing member, and on the outside of the member with shoulders, and an endless retaining sleeve surrounding the outer bearing member formed with an outwardly bent spring tongue to engage one of said shoulders.

FRANK WHITNEY.